J. M. HOTHERSALL.
FOLDED CORNER PAN OR VESSEL.
APPLICATION FILED APR. 20, 1908.
927,537.
Patented July 13, 1909.
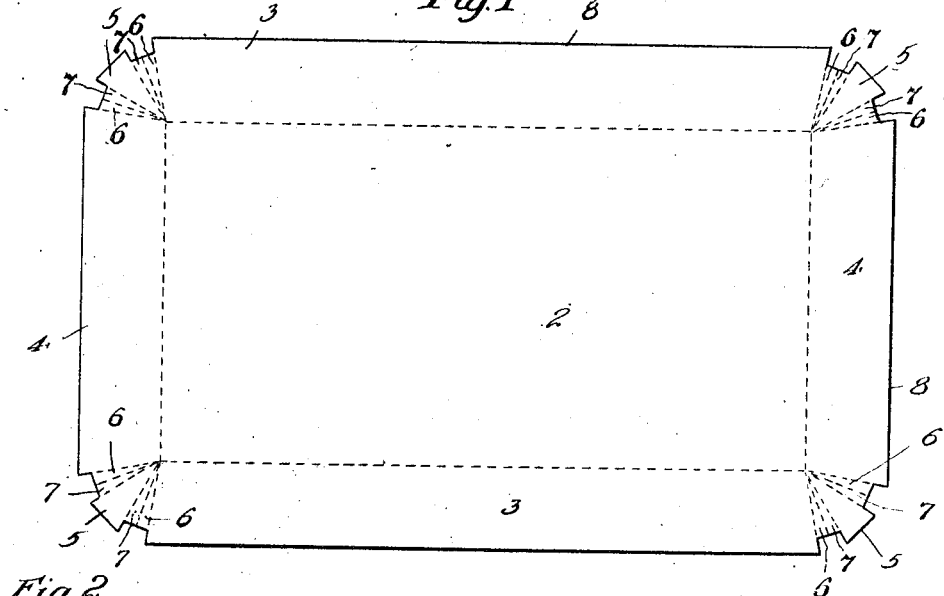
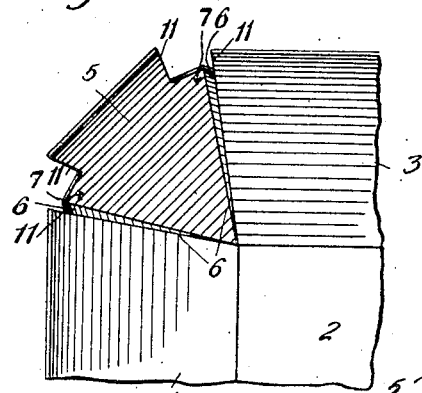
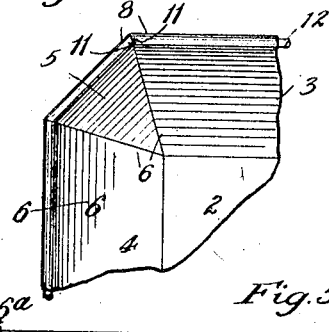
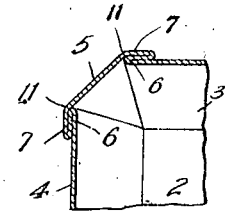
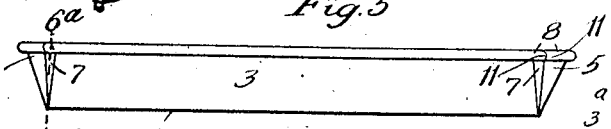
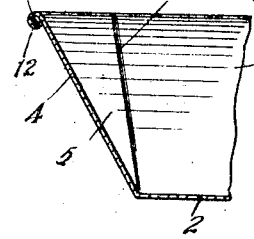
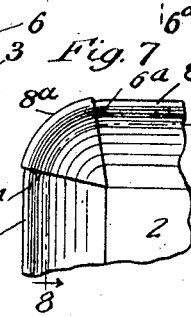
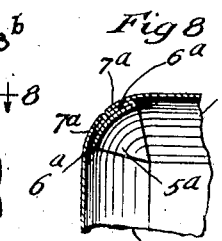
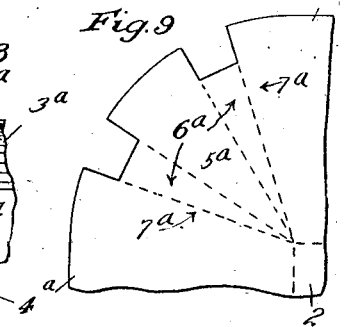
Witnesses:
Wm. Geiger
H. W. Munday
Inventor:
John M. Hothersall
By Munday, Evarts, Adcock & Clarke.
Attorneys

UNITED STATES PATENT OFFICE.

JOHN M. HOTHERSALL, OF NEW YORK, N. Y., ASSIGNOR TO AMERICAN CAN COMPANY, OF NEW YORK, N. Y., A CORPORATION OF NEW JERSEY.

FOLDED-CORNER PAN OR VESSEL.

No. 927,537.  Specification of Letters Patent.  Patented July 13, 1909.

Application filed April 20, 1908. Serial No. 427,962.

*To all whom it may concern:*

Be it known that I, JOHN M. HOTHERSALL, a citizen of the United States, residing in New York, in the county of New York and State of New York, have invented a new and useful Improvement in Folded-Corner Pans or Vessels, of which the following is a specification.

My invention relates to improvements in sheet metal pans or vessels of the kind having folded corners.

The object of my invention is to provide a one-piece sheet metal pan or vessel of a strong, simple, efficient and durable construction, capable of being cheaply manufactured and which may be made from a single blank without material waste of stock.

My invention consists in the means herein shown and described and more particularly specified in the claims by which this result or object is accomplished.

In the accompanying drawing, forming a part of this specification, Figure 1 is a plan view of the sheet metal blank from which my improved construction of pan is formed; Fig. 2 is a detail view of one corner of the same after it has been partially folded; Fig. 3 is a detail plan view showing one corner of the finished pan or vessel; Fig. 4 is a horizontal section through one corner of the pan; Fig. 5 is a side elevation; Fig. 6 is a detail section on line 6—6 of Fig. 3; Fig. 6ª is an enlarged detail section on lines 6ª—6ª of Fig. 5; Fig. 7 is a detail plan view showing one corner of the pan of a modified construction, in which the angle folds are upon the inside instead of upon the outside of the vessel; Fig. 8 is a horizontal section on line 8—8 of Fig. 7; Fig. 9 is a detail plan view showing the form of blank employed in the construction illustrated in Figs. 7 and 8.

The pan or vessel 1 comprises an integral bottom 2, integral sides 3, integral ends 4, integral angle corners 5, integral narrow or acute angle folds 6, 7, integrally uniting the angle corner 5 with the adjacent sides or ends 3, 4, the angle corner 5 being complementary to the inclination or flare of the upright sides and ends 3, 4, and integral marginal false wires or rolls 8 at the upper edges of the sides 3, ends 4 and angle corner 5. The outwardly turned integral rolls 8 at the upper edges of the sides 3, ends 4 and angle corners 5 have inclined, curved or mitered ends 11, so that they abut directly together and form a smooth, continuous roll at the upper end of the pan or vessel. As the angle folds 6, 7 are acute and narrow in width little stock is wasted, or unnecessarily taken up by them; and for the same reason also—their extreme narrowness—they afford little or no leverage to unfolding, and consequently produce a very strong and durable construction. The integral roll or false wire 8 embraces or engages the upper ends of the angle folds 6, 7, and thus serves to lock or hold the angle folds securely in position snugly against the sides and ends of the vessel. To further stiffen and strengthen the upper end or edge of the vessel the integral outwardly turned roll or false wire 8 at the upper edges of the sides, ends and angle corners, may embrace a wire 12.

In the construction illustrated in Figs. 7, 8 and 9, the angle folds 6ª, 7ª, which integrally unite the angle corner 5ª with the sides and ends 3ª, 4ª, are upon the inside instead of outside the vessel, as shown in Figs. 2 to 6, and in this construction the integral roll 8ª at the upper edge of the angle corner 5ª overlaps the ends of the rolls 8ᵇ at the upper edge of the sides and ends 3ª, 4ª. And in this modified construction also the angle corner 5ª is represented as being rounded or curved, thus giving the vessel as a whole rounded corners.

I claim:

1. A one-piece sheet metal pan or vessel, comprising an integral bottom, integral sides, integral ends, integral angle corners, integral angle folds uniting each of the angle corners with the adjacent sides and ends, and integrally outwardly turned rolls at the upper edges of said sides, ends and angle corners, embracing and locking the angle folds snugly and securely in position, substantially as specified.

2. A one-piece sheet metal pan or vessel, comprising a bottom, flaring sides and ends and angle corners, acute narrow angle folds uniting each of the angle corners with the adjacent sides and ends, and integral outwardly turned rolls at the upper edges of said sides, ends and angle corners, and engaging the upper ends of the angle folds to lock them in position, substantially as specified.

3. A one-piece sheet metal pan or vessel, comprising an integral bottom, integral sides, integral ends, integral angle corners, integral angle folds uniting each of the angle corners with the adjacent sides and ends, integral outwardly turned rolls at the upper edges of said sides, ends and angle corners, embracing and locking the angle folds snugly and securely in position, and a stiffening wire surrounding the upper end of the vessel and embraced by said rolls at the upper edges of the sides, ends and angle corners, substantially as specified.

JOHN M. HOTHERSALL.

Witnesses:
Louis C. Tissot,
Geo. F. Miller.